(12) United States Patent  (10) Patent No.: US 7,672,424 B2
Ziegler et al.  (45) Date of Patent: Mar. 2, 2010

(54) IMAGE RECONSTRUCTION WITH VOXEL DEPENDENT INTERPOLATION

(75) Inventors: Andy Ziegler, Hamburg (DE); Thomas Koehler, Hamburg (DE); Tim Nielsen, Hamburg (DE); Roland Proksa, Hamburg (DE); Dominic J. Heuscher, Aurora, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 438 days.

(21) Appl. No.: 11/575,902

(22) PCT Filed: Sep. 22, 2005

(86) PCT No.: PCT/IB2005/053148

§ 371 (c)(1),
(2), (4) Date: Mar. 23, 2007

(87) PCT Pub. No.: WO2006/038142

PCT Pub. Date: Apr. 13, 2006

(65) Prior Publication Data

US 2009/0202036 A1  Aug. 13, 2009

Related U.S. Application Data

(60) Provisional application No. 60/617,187, filed on Oct. 8, 2004.

(51) Int. Cl.
*A61B 6/00* (2006.01)
(52) U.S. Cl. .............................. 378/19; 378/4
(58) Field of Classification Search ...................... 378/4, 378/19
See application file for complete search history.

(56) References Cited

U.S. PATENT DOCUMENTS

| 5,128,864 | A |   | 7/1992  | Waggener et al. |
| 5,559,335 | A | * | 9/1996  | Zeng et al. ............. 250/363.04 |
| 5,838,756 | A | * | 11/1998 | Taguchi et al. ................. 378/4 |
| 5,960,056 | A | * | 9/1999  | Lai ............................... 378/4 |
| 5,987,157 | A | * | 11/1999 | Schaller et al. ............. 382/131 |
| 6,104,775 | A |   | 8/2000  | Tuy |
| 6,118,841 | A | * | 9/2000  | Lai ............................. 378/19 |
| 6,205,350 | B1 |  | 3/2001  | Lorenz et al. |
| 6,341,154 | B1 |  | 1/2002  | Besson |
| 6,415,013 | B1 |  | 7/2002  | Hsieh et al. |
| 6,418,184 | B1 |  | 7/2002  | Wang et al. |
| 6,452,996 | B1 |  | 9/2002  | Hsieh |
| 2004/0081270 | A1 | * | 4/2004 | Heuscher ........................ 378/4 |

OTHER PUBLICATIONS

Kohler et al., SNR-weighted ART applied to transmission tomography, IEEE Xplore, vol. 4, 2003, pp. 2739-2742.*

(Continued)

*Primary Examiner*—Allen C. Ho
*Assistant Examiner*—Alexander H Taningco (57) ABSTRACT

A radiographic imaging apparatus includes a radiation detector (16) and a radiation source (12) which projects a non-parallel beam of radiation into field of view (14). A footprint of each voxel (v) which is projected on the detector (16) is corrected based on the position of the voxel (v) in the field of view (14) in relation to the radiation detector (16) and the radiation source (12). The contributions from substantially parallel redundant projections are further combined based on a fractional distance frac from a center point (82) of the voxel (v) to a center of each of the adjacent redundant projections.

22 Claims, 4 Drawing Sheets

OTHER PUBLICATIONS

Matej et al., Iterative Tomographic Image Reconstruction Using Fouier-Based Forward and Back-Projectors, IEEE, 2003, pp. 1701-1705.*

Lewitt, Multidimensional digital image representations using generalized Kaiser-Bessel window functions, J. Opt. Soc. Am., vol. 7, No. 10, Oct. 1990, pp. 1834-1846.*

Brix, G., et al.; Use of scanner characteristics in iterative image reconstruction for high-resolution positron emission tomography studies of small animals; 1997; European Journal of Nuclear Medicine; 24(7)779-786.

Donaire, J. G., et al.; On using global optimization to obtain better performance of a MART algorithm in 3D x-ray tomography; 2002; Journal of Imaging Science and Technology; 46(3)247-256.

Flohr, T., et al.; Evaluation of approaches to reduce spiral artifacts in multi-slice-spiral CT; 2003; http://rsna2003.rsna.org; reprinted Mar. 20, 2007;abstract.

Hsieh, J.; Adaptive interpolation approach for multislice helical CT reconstruction; 2003; SPIEWeb; http://spie.org/scripts/abstract.

Lewitt, R. M.; Alternatives to voxels for image representation in iterative reconstruction algorithms; 1992; Physics in Medicine & Biology; 37(3)705-716.

Matej, S., et al.; Practical Considerations for 3-D Image Reconstruction Using Spherically Symmetric Volume Elements; 1996; IEEE Trans. on Medical Imaging; 15(1)68-78.

Mueller, K., et al.; Eliminating popping artifacts in sheet buffer-based splatting; 1998; Proc. of Visualization Conf.; pp. 239-245.

* cited by examiner

IMAGE RECONSTRUCTION WITH VOXEL DEPENDENT INTERPOLATION

CROSS REFERENCE TO RELATED APPLICATIONS

This application claims the benefit of U.S. provisional application Ser. No. 60/617,187 filed Oct. 8, 2004, which is incorporated herein by reference.

The present application relates to the diagnostic imaging arts. It finds particular application in the computed tomography imaging of a subject, and will be described with particular reference thereto. However, it also may find application in other types of computed tomography imaging, single photon emission computed tomography (SPECT), positron emission tomography (PET), three-dimensional x-ray imaging, and the like.

In general, a computed-tomography system typically comprises an x-ray source which projects a cone or wedge beam of radiation and a two-dimensional x-ray detector which rotate together around an object to be examined. From several orientations the object is irradiated with the divergent x-ray beam from the x-ray source. At these respective orientations the x-ray detector receives x-radiation that has passed through the object and forms an attenuation profile for the orientation at issue. The attenuation profiles represent the attenuation of incident x-rays in the object due to absorption of x-rays along the path of the x-rays through the object at the orientation at issue.

Typically, in the process of the reconstruction of a CT image, for each voxel to be reconstructed the detector elements which receive radiation along the radiation ray that passed through the voxel are sampled. If the ray through the voxel is received by more than one detector element, a voxel-independent interpolation is made between the detector elements. However, voxel independent interpolation is somewhat problematic. Let us consider, for example, two voxels, which lie along a common ray, but one closer to the source and another further from the source (closer to the detector). In forward projection, during the measurement, the two voxels contribute differently to the measured value at the detector elements due to the different ray density at the two positions. In the backprojection, however, the backprojected values are the same for the two voxels because the interpolation on the detector is voxel independent. Particularly, in the case of a non-parallel beam geometry, the center of the sampled ray and the center of each voxel are not coincident. The backprojection does not fit the model of the data acquisition. This results in artifacts in the reconstructed image.

The present invention contemplates an improved apparatus and method that overcomes the aforementioned limitations and others.

According to one aspect of the present application a radiographic imaging apparatus for reconstructing projection data is disclosed. A means performs a voxel dependent interpolation of the projection data. A means three-dimensionally backprojects the interpolated projection data.

According to another aspect of the present application, a radiographic imaging method for reconstructing projection data is disclosed. A voxel dependent interpolation of the projection data is performed The interpolated projection data is three-dimensionally backprojected.

One advantage of the present application resides in applying a dynamic interpolation kernel for each voxel.

Another advantage resides in reducing aliasing.

Another advantage resides in weighting multiple rays, projected from the substantially same view, to interleave on a voxel-by-voxel basis.

Another advantage resides in increased resolution.

Yet another advantage resides in reduced image artifacts.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

Figure 1:
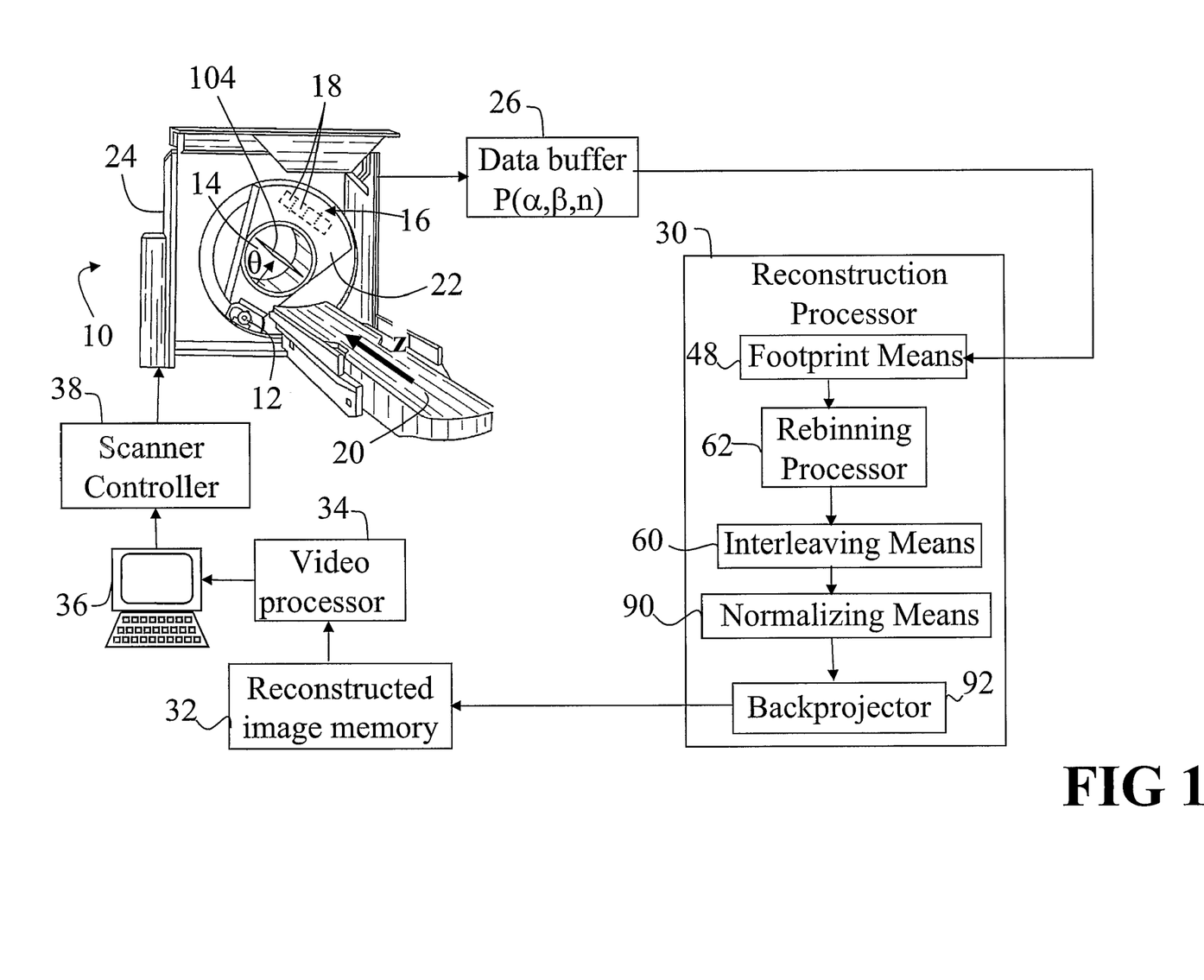
FIG. 1 shows a diagrammatic representation of a computed tomography imaging system.

With reference to FIG. 1, a computed tomography scanner 10 houses or supports a radiation source 12, which in one embodiment, is an x-ray tube, that projects a radiation beam into an examination region 14 defined by the scanner 10. After passing through the examination region 14, the radiation beam is detected by a radiation detector array 16 which includes an array of detector elements or pixels 18 and which is arranged to detect the radiation beam after passing through the examination region 14. The detector elements 18 are preferably arranged in a rectangular matrix of pixels. In a typical x-ray tube embodiment of the radiation source 12, the x-ray tube produces a diverging x-ray beam having a cone beam, wedge beam, or other beam geometry that expands as it passes through the examination region 14 to substantially fill the area of the radiation detector array 16.

An imaging subject is placed on a couch 20 or other support that moves the imaging subject into the examination region 14. The couch is linearly movable along an axial direction $O_Z$ designated as a Z-direction in FIG. 1. The radiation source 12 and the radiation detector 16 are oppositely mounted respective to the examination region 14 on a rotating gantry 22, such that rotation of the gantry 22 effects revolving of the radiation source 12 about the examination region 14 to provide an angular range of views. The acquired data is referred to as projection data since each detector element detects a signal corresponding to an attenuation line integral taken along a line, ray, narrow cone, or other substantially linear projection extending from the source to the detector element. The radiation detector 16 is shown mounted on the rotating gantry 22 in FIG. 1; however, it is also contemplated to replace the x-ray detector array 16 by a two-dimensional band of x-ray detector elements mounted around a stationary gantry 24.

In one embodiment, an axial projection data set is acquired with the rotating gantry 22 rotating while the couch 20 is stationary. The axial projection data set includes a plurality of axial slices corresponding to rows or columns of detector elements transverse to the axial or Z-direction. Optionally, additional axial slices are acquired by performing repeated axial scans and moving the couch 20 between each axial scan.

In another embodiment, a helical projection data set is acquired by rotating the gantry 22 simultaneously with continuous linear motion of the couch 20 to produce a helical trajectory of the radiation source 12 around the imaging subject disposed on the couch 20.

Typically, during scanning, some portion of the radiation passing along each projection is absorbed by the imaging subject to produce a generally spatially varying attenuation of the radiation. The detector elements of the radiation detector array 16 sample the radiation intensities across the radiation beam to generate radiation absorption projection data. As the gantry 22 rotates so that the radiation source 12 revolves around the examination region 14, a plurality of angular views of projection data are acquired, collectively defining a projection data set that is stored in a buffer memory 26.

For a source-focused acquisition geometry in a multi-slice scanner, readings of the attenuation line integrals or projections of the projection data set stored in the buffer memory 26 can be parameterized as P($\alpha,\beta$,n) where $\alpha$ is the source angle of the radiation source 12 determined by the position of the rotating gantry 22, $\beta$ is the angle within the fan ($\beta\in[-\Phi/2, \Phi/2]$ where $\Phi$ is the fan angle), and n is the detector row number in the $O_Z$ direction.

A reconstruction processor 30 applies filtered backprojection, iterative reconstruction, or another image reconstruction technique to reconstruct the projection data set into one or more reconstructed images that are stored in a reconstructed image memory 32. The reconstructed images are processed by a video processor 34 and displayed on a user interface 36 or otherwise processed or utilized. In one embodiment, the user interface 36 also enables a radiologist, technician, or other operator to interface with a computed tomography scanner controller 38 to implement a selected axial, helical, or other computed tomography imaging session.

Figure 2:
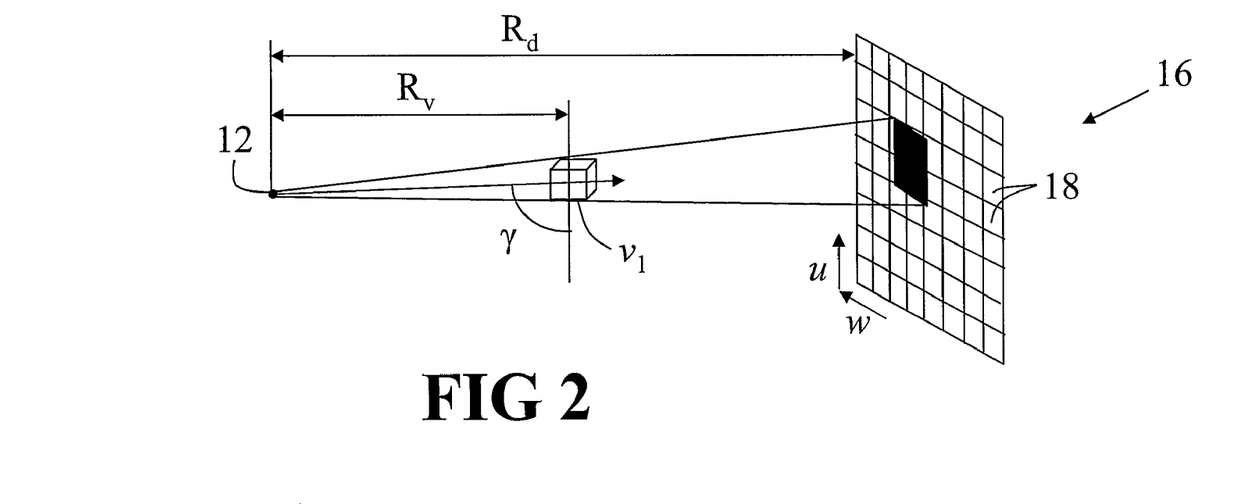
FIG. 2 diagrammatically illustrates a first voxel projected on a detector.
Figure 3:
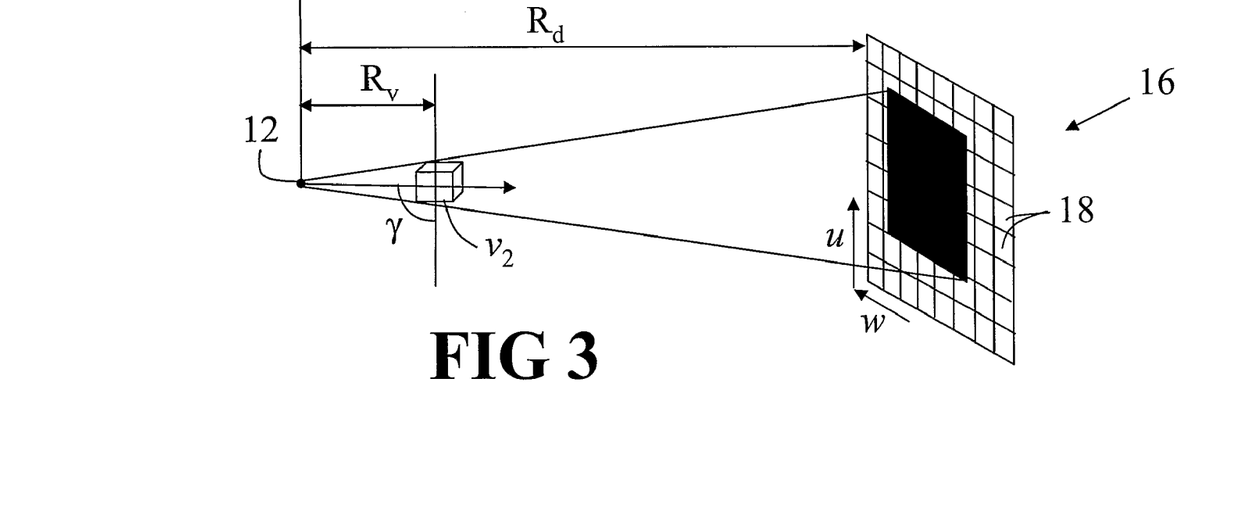
FIG. 3 diagrammatically illustrates a second voxel projected on a detector.

With reference to FIGS. 2 and 3, a first voxel $v_1$ and a second voxel $v_2$ are projected into the same position on the detector array 16. Each projection results in a different footprint dependent on positions of the voxels $v_1$, $v_2$ in the field of view (FOV). As it can be observed in FIG. 2, the first voxel $v_1$, which is positioned closer to the detector array 16 than the second voxel $v_2$, creates a smaller footprint on the detector array 16, intersecting approximately nine pixels or detector elements 18. As seen in FIG. 3, the second voxel $v_2$, which is positioned further away from the detector array 16 than the first voxel $v_1$, creates a larger footprint on the detector array 16 of approximately thirty pixels 18. E.g., because of the changes in the ray density in the FOV, voxels which are situated further away from the detector 16 produce larger footprints; voxels which are situated closer to the detector 16 produce smaller footprints. Because of the changes in the ray density, the voxels $v_1$, $v_2$ contribute differently to the measurement as seen in FIGS. 2 and 3 which is taken into consideration in the reconstruction step to reduce the artifacts as discussed in a greater detail below.

Figure 4:
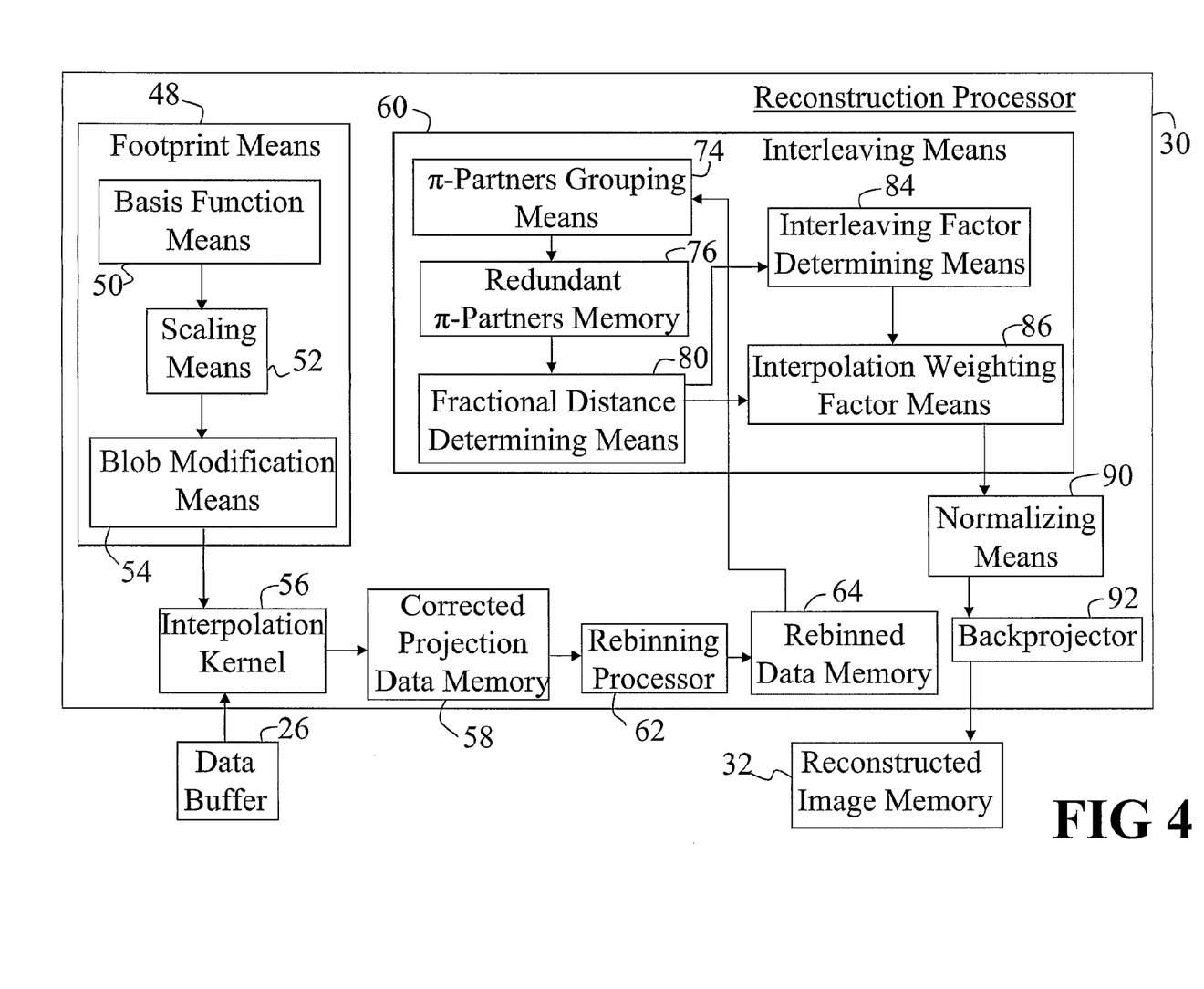
FIG. 4 shows a diagrammatical representation of a portion of a computed tomography system.

With continuing reference to FIGS. 1-3 and further reference to FIG. 4, a footprint means 48 corrects a voxel v footprint on the detector array 16 to account for the changes in the ray density such that only the pixels 18 which are positioned under the corrected footprint are interpolated. More particularly, a basis function means 50 projects a prespecified basis function on the detector 16 for each voxel v. Generally, the continuous $\mu$-value distribution f(x) of a scanned object can be approximated by a sum of basis functions b(x) and coefficients $c_i$ which are arranged on a grid with grid points $x_i$:

$$f'(x) = \sum_i c_i b(x - x_i),$$

where $c_i$ is the set of coefficients of the image representations; b(x) is a unit voxel basis function.

Preferably, the basis function is a spherically symmetric, continuous basis-function, such as Kaiser-Bessel function, which projects the voxel v into a spherically symmetric blob on the detector 16. The rotational symmetry of the spherical voxel allows efficient calculation of the projections of the image representation. However, it is also contemplated that a basis function may be any other suitable function to project voxels in the shape of an ellipse, cube, or any other suitable geometric shape.

A scaling means 52 scales the projection by a ratio of the ray densities. Generally, for each voxel v, the size of the footprint of the blob on the detector 16 is scaled with a first ray density ratio factor $s_{xy}$ in the plane transverse to the axial direction $O_Z$ and a second ray density ratio factor $s_z$ in the plane parallel to the axial direction $O_Z$:

$$s_{xy} = d_{d,xy}/d_{v,xy}$$

$$s_z = d_{d,z}/d_{v,z}$$

where $d_{v,xy}$; $d_{v,z}$ is the ray density at the voxel position,
$d_{d,xy}$ is the ray density on the detector 16 in the plane transverse to the axial direction $O_Z$, and
$d_{d,z}$ is the ray density on the detector 16 in the plane parallel to the axial direction $O_Z$.

In one embodiment, in which a cone-beam geometry is used with a focus centered detector, the density of photon rate changes depending on the distance of the detector 16 from the source 12 and the distance of the voxel v from the source 12. The scaling means 52 applies a first ratio factor $s_{xy}$ to the blob footprint in the plane transverse to the axial direction $O_Z$ which is calculated as:

$$s_{xy} = R_d/R_v$$

where $R_d$ is the distance from the detector 16 to the source 12, and
$R_v$ is the distance from the voxel v to the source 12.

The scaling means 52 applies a second ratio factor $s_z$ to the blob footprint in the plane parallel to the axial direction $O_Z$ which is calculated as:

$$s_z = s_{xy}/\cos(\gamma)$$

where $s_{xy}$ is the first ratio factor applied in the plane of gantry; and
$\gamma$ is an angle between the plane transverse to the axial direction $O_Z$ and a vector pointing from the source 12 to the voxel v.

A blob modification means 54 changes the footprint of the blob, F(u, w), where u and w are the coordinates on the detector 16 in the plane transverse to the axial direction $O_Z$ and parallel to the axial direction $O_Z$, respectively. The modified footprint of the blob is represented by F(u * $s_{xy}$, w * $s_z$). The modified footprint presents an interpolation kernel 56 on the detector 16 which fits precisely the model of the data acquisition. E.g., the pixels 18, which are positioned under the modified footprint, are interpolated. The corrected modified footprint or corrected projection data is stored in a corrected projection data memory 58.

A reconstructed image with voxel-dependent scaled footprints of blobs shows less artifacts than a voxel-independent reconstruction.

Figure 5:
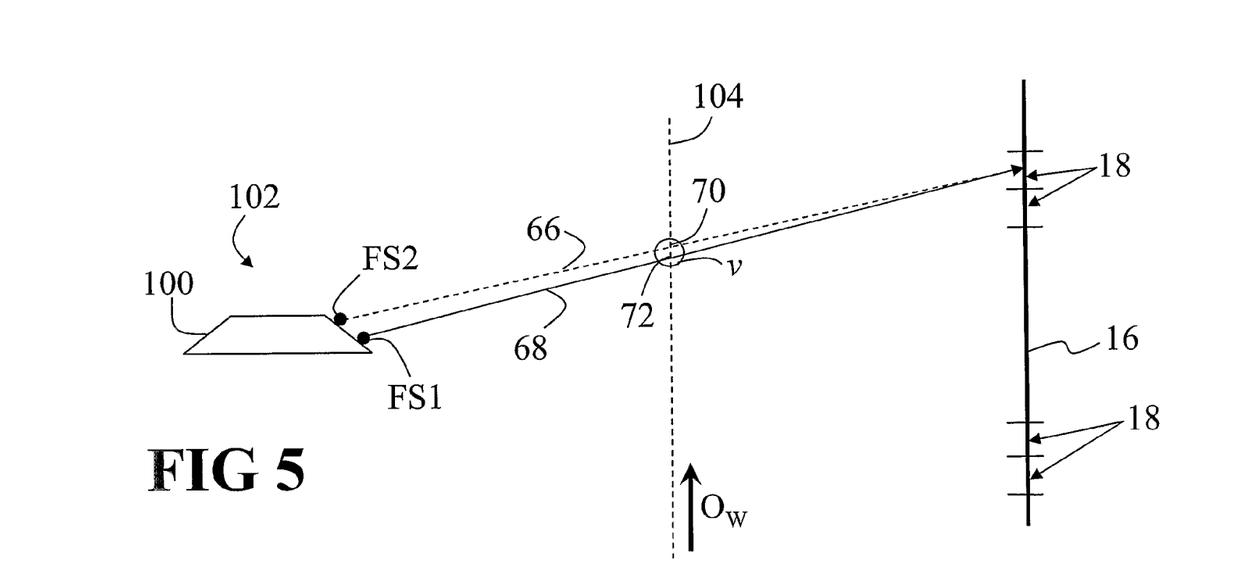
FIG. 5 diagrammatically illustrates the dual focal spot modulation viewed along the $O_Z$ direction and transverse to the $O_U$ direction.

With continuing reference to FIGS. 1 and 4 and further reference to FIG. 5, an interleaving means or process 60 combines contributions from the substantially parallel, redundant rays based on an interpolation weighting factor. Preferably, a rebinning processor 62 rebins the corrected projection data from cone to parallel beam geometry into a set of parallel views. Each view contains equidistant π-lines, where a π-line is defined as a line integral that is contained in the axial plane, i.e., perpendicular to the rotation axis, and intersecting the scan FOV. The rebinning can be expressed as $P(\alpha,\beta,n) \rightarrow P(\theta,l,n)$ where θ parameterizes the projection number that is composed of parallel readings parameterized by l which specifies the distance between a reading and the isocenter, and n is the detector row number. The rebinned parallel ray projection data set $P(\theta,l,n)$ is stored in a rebinned data memory 64.

When more than one π-partners or redundant rays or redundant π-partners or contributing projections 66, 68 intersect the voxel v at the same angle θ but at a slightly different positions 70, 72, the redundant rays 66, 68 can be interleaved to increase resolution. Redundancy is used to connote generally parallel rays that intersect the given voxel. The redundant rays may traverse the voxel from opposing directions or be slightly offset from each other. Preferably, a π-partners grouping means 74 groups together the redundant π-partners for maximum interleaving. The grouped π-partners are stored in a redundant π-partners memory 76.

Figure 6:
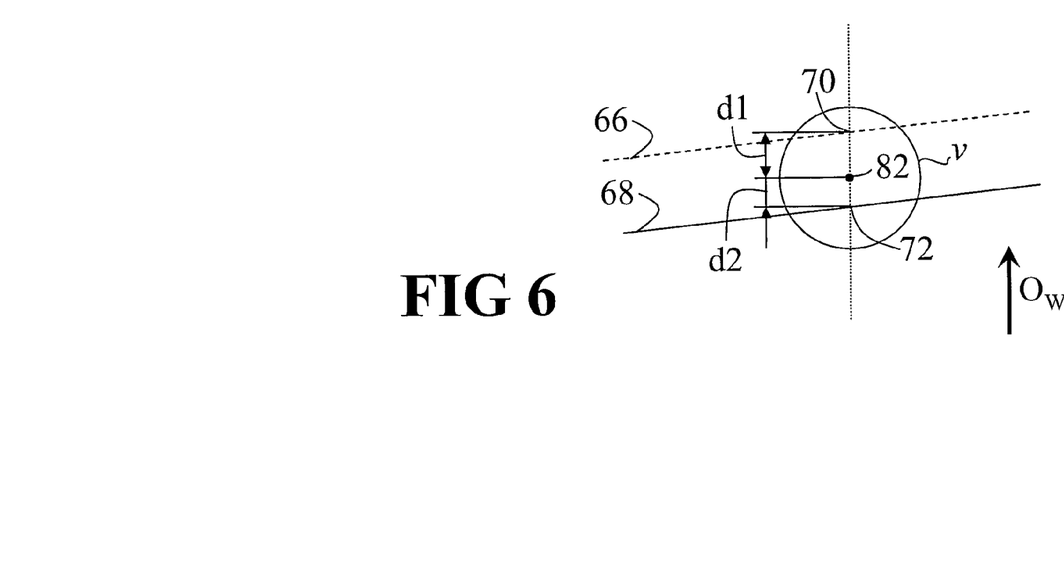
FIG. 6 diagrammatically illustrates a voxel intersected by two substantially parallel π-partners.

With continuing reference to FIGS. 4-5 and further reference to FIG. 6, a fractional distance determining means 80 calculates a fractional distance frac d1, d2 from a center point 82 of the voxel v to the center of each of the redundant adjacent rays 66, 68. If a voxel v is falling in between two projections, e.g. the projections 66, 68 are barely touching the voxel v, the fractional distances d1, d2 are each equal to ½. Such position is the least preferable position and will have the lowest interpolation weighting factor. If the voxel center 82 is positioned directly on one of projection rays 66, 68, then one of the fractional distances d1, d2 is equal to 0. For such projection, the biggest interpolation weighting factor is given. E.g., the rays closest to the voxel center 82 are weighted more heavily; the rays that are barely touching the voxel v are weighted more slightly.

An interleaving factor determining means 84 determines an interleaving factor $I_f$ for each set of the redundant π-partners 66, 68. The interleaving factor $I_f$ is determined in advance to modify the weights of the interpolated rays during the backprojection of a given voxel v to achieve the most effective interleaving. E.g., if the interleaving factor $I_f$ is selected to be equal to 0, no interleaved weighting occurs and normal interpolation is used. If the interleaving factor $I_f$ is selected to be less than 1, a projection output value $P_{out}$ reverts to a normal interpolation if there are no redundant π-partners or interleaved rays. As a value of $I_f$ approaches 1, interleaved rays are heavily used to calculate the projection output value $P_{out}$. Generally, the interpolation factor $I_f$ value is chosen to be less than 1 to avoid singularity when the interpolated rays are located exactly at the midpoint positions. Preferably, the interpolation factor $I_f$ value is less than [1−(Smallest Non-Zero $W_t$)] to avoid singularity in the normalization. The interleaving factor $I_f$ could be defined in u ($I_{uf}$) and/or w ($I_{wf}$) directions. Optionally, the interleaving factor value $I_f$ changes from view to view.

An interpolation weighting factor means 86 generates an interpolation weighting factor $W_t$ for each contributing projection 66, 68:

$$W_t = a|0.5 - \text{frac}| + b,$$

where frac is a fractional part of interpolation index in the 'x' direction;

$a = 2 \cdot I_f$;

$b = 1 - I_f$; and $I_f$ is the interpolation factor.

A normalizing means 90 normalizes the calculated contributions to the voxel v by the sum of all weights from the contributing projections 66, 68 in the same way as other weights are normalized in the reconstruction process 30 as well known in the art:

$$P_{out} = (W_t \cdot W_o \cdot P) / \Sigma(W_t \cdot W_o),$$

where $P_{out}$ is a projection output value;

$W_t$ is the interpolation weighting factor;

$W_o$ represents all other weights; and

P is the interpolated projection value where the u-dimension interpolation uses the value frac.

A backprojector 92 backprojects the normalized projection output $P_{out}$ into the reconstructed image memory 32.

With reference again to FIG. 1 and continuing reference to FIGS. 4-5, the interleaving process 60 combines contributions from the redundant rays 66, 68 in an imaging system with a dual focal spot modulation (DFS) which is known in the art. DFS is used to achieve a higher sampling rate in the $O_W$ direction (direction orthogonal to the axial direction $O_Z$) by a use of dual focal spot modulation of the radiation source 12 in the $O_W$ direction. The focal spot is shifted between two positions FS1 and FS2 on a beveled surface 100 of an anode 102 of the radiation source 12. Filled circles on a meridian plane 104 indicate samples acquired using the focal spot FS1, and open squares on the meridian plane 104 indicate samples acquired using the focal spot FS2. Of course, other multiple focal spot modulations are also contemplated.

The rebinning processor 62 rebins the projections 66, 68 of the two modulated focal spots FS1, FS2 to the parallel beam geometry. The π-partners grouping means 74 groups together the redundant π-partners for maximum interleaving. The fractional distance determining means 80 calculates a fractional distance frac d1, d2 from a center point 82 of the voxel v to each of the redundant adjacent rays 66, 68. The interleaving factor determining means 84 determines an interleaving factor $I_f$ for each set of the redundant π-partners 66, 68.

The interpolation weighting factor means 86 generates an interpolation weighting factor $W_t$ for each contributing projection 66, 68:

$$W_t = a|0.5 - \text{frac}| + b,$$

where frac is a fractional part of interpolation index in the 'x' direction;

$a = 2 \cdot I_f$;

$b = 1 - I_f$; and $I_f$ is the interpolation factor.

Of course, it is also contemplated that the rays from a 180° view can be similarly combined. E.g., the four rays are weighted based on the fractional distance to the voxel and the total sum of the weights is normalized.

The normalizing means 90 normalizes the calculated contributions to the voxel v by the sum of all weights from the contributing projections 66, 68:

$$P_{out} = (W_t \cdot W_o \cdot P) / \Sigma(W_t \cdot W_o),$$

where $P_{out}$ is a projection output value;
$W_t$ is the interpolation weighting factor;
$W_o$ represents all other weights; and
P is the interpolated projection value where the u-dimension interpolation uses the value frac.

The backprojector 92 backprojects the normalized projection output $P_{out}$ into the reconstructed image memory 32.

It should be appreciated that to benefit from the interleaving process 60 in the reconstruction process 30, the projection samples should be located as close as possible to their original native geometric sampling positions and orientations (in U and W). E.g., rebinning in the U-direction preferably retains the original sample positions near scan center, i.e. dU=S dα with matching rays near scan center (dα is the original angular spacing of the rays in an acquired projection). Likewise, rebinning which is performed in the W-direction preferably retains the original sample positions near the center of the cone.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A radiographic imaging apparatus for reconstructing projection data comprising:
a radiation detector;
a radiation source which projects a non-parallel beam of radiation into a field of view; and
a processor programmed to perform the steps of:
performing a voxel dependent interpolation of the projection data, the interpolating step including:
correcting a footprint of each voxel projected on the detector based on a position of the voxel in the field of view in relation to the radiation detector and the radiation source and scaling the footprint of the projected voxel along a plane transverse to an axial direction by a first ray density ratio factor $s_{xy}$; and
three-dimensionally backprojecting the interpolated projection data.

2. The apparatus as set forth in claim 1, wherein the footprint correcting step includes:
projecting a prespecified basis function on the detector.

3. The apparatus as set forth in claim 2, wherein the first ray density ratio factor $s_{xy}=d_{d,xy}/d_{v,xy}$ and the footprint correcting means further includes:
scaling the footprint of the projected voxel along a plane parallel to the axial direction by a second ray density factor $s_z=d_{d,z}/d_{v,z}$, where $d_{v,xy}$; $d_{v,z}$ is the ray density at the position of the voxel in the field of view, $d_{d,xy}$ is the ray density on the detector in the plane transverse to the axial direction, and $d_{d,z}$ is the ray density on the detector in the plane parallel to the axial direction.

4. The apparatus as set forth in claim 2, wherein the first ray density ratio factor $s_{xy}=R_d/R_v$, where $R_d$ is a distance of the detector from the source, and $R_v$ is a distance of the voxel from the source and the footprint connecting step further including:
scaling the footprint along a plane parallel to the axial direction by a second ray density factor $s_z=s_{xy}/\cos(\gamma)$, where γ is an angle between the plane transverse to the axial direction and a vector pointing from the source to the voxel.

5. The apparatus as set forth in claim 4, wherein the footprint correcting step further includes:
modifying the footprint of the projected voxel to change the coordinates (u, w) of the voxel footprint on the detector to coordinates (u * $s_{xy}$, w * $s_z$), where u and w are the coordinates of the footprint of the projected voxel on the detector in the plane transverse to the axial direction and parallel to the axial direction, respectively.

6. The apparatus as set forth in claim 1, wherein the processor is further programmed to perform the steps of:
combining contributions from substantially parallel redundant projections.

7. The apparatus as set forth in claim 6, wherein the combining step includes:
determining a fractional distance frac from a center point of a voxel to a center of each of the adjacent redundant projections.

8. The apparatus as set forth in claim 7, wherein the combining step further includes:
determining an interleaving factor $I_f$ based on at least the fractional distance frac; and
calculating an interpolation weighting factor for each of the redundant projections $W_t=a|0.5-\text{frac}|+b$, where frac is a fractional distance in a direction transverse to an axial direction, $a=2 \cdot I_f$, $b=1-I_f$, where $I_f$ is the determined interpolation factor.

9. The apparatus as set forth in claim 8, wherein the processor is further programmed to perform the step of:
normalizing the calculated interpolation weighting factors by a sum of all weights from the redundant projections $P_{out}=(W_t \cdot W_o \cdot P)/\Sigma(W_t \cdot W_o)$, where $P_{out}$ is a projection output value, $W_t$ is the interpolation weighting factor, $W_o$ represents all other weights, and P is the interpolated projection value.

10. The apparatus as set forth in claim 9, wherein the radiation source provides a focal spot modulation that increases a sampling rate transverse to the axial direction wherein the focal spot modulation produces at least two substantially parallel projections which are effectively interleaved to increase the resolution along the axial direction.

11. The apparatus as set forth in claim 8, further including:
a gantry on which the radiation source is disposed, the gantry revolving the radiation source about an associated imaging subject during the acquisition of the projection data set such that the projection data set includes corresponding opposing projections angularly separated by 180°; and
wherein the processor futher rebins the projection data set into parallel projection views, wherein the combining step combines contributions from 180° redundant projections.

12. A radiographic imaging apparatus for reconstructing projection data comprising:
a radiation source which projects a non-parallel beam of radiation into a field of view;
a radiation detector which detects the radiation; and;
a processor which reconstructs projection data from the radiation detector, the processor being programmed to perform the steps of:
performing a voxel dependent interpolation of the projection data;
determining a fractional distance frac from a center point of a voxel to a center of each of adjacent redundant projections;
determining an interleaving factor $I_f$ based on at least the fractional distance frac;

calculating an interpolation weighting factor for each of the redundant projections; and three-dimensionally backprojecting the interpolated projection data.

13. A radiographic imaging method for reconstructing projection data comprising:

performing a voxel dependent interpolation of the projection;

three-dimensionally backprojecting the interpolated projection data;

projecting a prespecified basis function on a radiation detector;

correcting a footprint of each projected voxel based on a position of the voxel in a field of view in relation to the radiation detector and a radiation source; and scaling the footprint of the projected voxel along a plane transverse to an axial direction by a first ray density ratio factor $s_{xy}$.

14. The method as set forth in claim 13, wherein the basis function is one of:

a spherically continuous basis function which projects the voxel into a spherically symmetric footprint of the voxel;

a Kaiser-Bessel function; and a Gaussian function.

15. The method as set forth in claim 13, wherein the first ray density factor $s_{xy}$ is defined as $s_{xy}=d_{d,xy}/d_{v,xy}$ and the step of correcting the footprint includes:

scaling scaling the footprint of the projected voxel along a plane parallel to the axial direction by a second ray density factor $s_z=d_{d,z}/d_{v,z}$, where $d_{v,xy}$; $d_{v,z}$ is the ray density at the position of the voxel in the field of view, $d_{d,xy}$ is the ray density on the detector in the plane transverse to the axial direction, and $d_{d,z}$ is the ray density on the detector in the plane parallel to the axial direction.

16. The method as set forth in claim 13, wherein the first ray density ratio factor $s_{xy}=R_d/R_v$, where $R_d$ is a distance of the detector from the source, and $R_v$ is a distance of the voxel from the source and the step of correcting the footprint further includes:

scaling the footprint along a plane parallel to the axial direction by a second ray density factor $s_z=s_{xy}/\cos(\gamma)$, where $\gamma$ is an angle between the plane transverse to the axial direction and a vector pointing from the source to the voxel.

17. The method as set forth in claim 16, further including:

modifying the footprint of the projected voxel to change the coordinates (u, w) of the voxel footprint on the detector to coordinates (u * $s_{xy}$, w * $s_z$), where u and w are the coordinates of the footprint of the projected voxel on the detector (in the plane transverse to the axial direction and parallel to the axial direction, respectively.

18. The method as set forth in claim 13, further including:

determining a fractional distance frac from a center point of a voxel to adjacent redundant projections; and combining contributions from the redundant projections.

19. The method as set forth in claim 18, wherein $s_{xy}=d_{d,xy}/d_{v,xy}$ and the step of correcting the footprint includes:

scaling the footprint of the projected voxel along a plane parallel to the axial direction by a second ray density factor $s_z=d_{d,z}/d_{v,z}$, where $d_{v,xy}$; $d_{v,z}$ is the ray density at the position of the voxel in the field of view, $d_{d,xy}$ is the ray density on the detector in the plane transverse to the axial direction, and $d_{d,z}$ is the ray density on the detector in the plane parallel to the axial direction.

20. The method as set forth in claim 18, further including:

calculating an interpolation weighting factor for each of the redundant projections $W_f=a|0.5-frac|+b$, where frac is a fractional distance in a direction transverse to an axial direction, $a=2 \cdot I_f$, $b=1-I_f$, where $I_f$ is an interpolation factor determined in advance.

21. The method as set forth in claim 20, further including:

normalizing the calculated interpolation weighting factors by a sum of all weights from the redundant projections $P_{out}=(W_f \cdot W_o \cdot P)/\Sigma(W_f \cdot W_o)$, where $P_{out}$ is a projection output value, $W_f$ is the interpolation weighting factor, $W_o$ represents all other weights, and P is the interpolated projection value.

22. A computed tomography apparatus including a processor programmed for performing the method of claim 13.

* * * * *